Patented Apr. 11, 1950

2,503,297

UNITED STATES PATENT OFFICE 2,503,297

LIGNIN ALIPHATIC ACIDS AND SALTS

John S. Pierce, Richmond, Va., assignor of one-half to The Albemarle Paper Manufacturing Company, Richmond, Va.

No Drawing. Application December 3, 1945, Serial No. 632,611

9 Claims. (Cl. 260—124)

1

The general purpose of this invention is the utilization of lignin. It relates, in general, to products formed from alkali lignin and methods of forming these products, and, more specifically, to lignin aliphatic acids and salts of these acids and to methods for the preparation of these products.

Lignin has been called the greatest economic waste of the world. It is estimated that approximately 1,250,000 tons of lignin are available in the United States each year from the sulfate process and the soda process for the preparation of paper pulp (see Robert S. Aires, Chemical Industries, 46, 226 (1945)). This lignin, formed from the lignocellulose of the wood, in the process of cooking the wood pulp, is soluble in alkali and can be precipitated by acidification of the black liquor in which it is found at the completion of the pulping process. Lignin from the sulfite process, present in the waste liquor as lignin sulfonic acid and/or salts of this acid, can be converted into an alkali soluble and acid insoluble lignin by heating in a sealed tube with concentrated sodium hydroxide solution. (See Pearl and Benson, Technical Association Papers, Series XXIV, No. 1, page 619 (1941). Published by Technical Association of the Pulp and Paper Industry, New York, N. Y.)

Alkali soluble lignin can also be prepared readily from corn cobs, corn stalks, various kinds of straw, bagasse and other lignocellulose materials formed by the growth of plants. Since the estimated agricultural waste in the United States is approximately 150,000,000 tons each year (see Robert S. Aires, Chemical Industries, 46, 226 (1945)), it is evident that a tremendous amount of lignin is available.

The importance of lignin is indicated by the fact that scores of workers have published hundreds of papers on chemical research on the subject. In spite of all this work, much of which has been devoted to an attempt to assign lignin a chemical structure, no satisfactory constitutional formula has been assigned to lignin (see "Wood Chemistry," 1944, page 350. Edited by Louis E. Wise, Reinhold Publishing Co., New York, N. Y.). The suggestion has been made by a prominent investigator (see A. Bailey, Technical Association Papers, Series XXIV, No. 1, page 621 (1941), published by Technical Association of the Pulp and Paper Industry, New York, N. Y.) that lignin in wood exists as "a mixture of isomers and homologues with properties so nearly identical as to preclude separation."

In most of the published work on lignin, including patents, the product is treated as a definite compound. This treatment is generally quite satisfactory, since, for most of the uses to which lignin is put, including the uses described in the present specification, "a mixture of isomers and homologues so nearly identical as to preclude separation" acts as a chemical individual.

2

The present invention is concerned primarily with the alkali soluble and acid insoluble material present in the black liquor of the sulfate process for the preparation of wood pulp. This material, usually referred to as "alkali lignin," is also found in the black liquor of the soda process; it can be formed from the lignosulfonic acids and lignosulfonates of the sulfite process and also from various lignocellulose materials, including bagasse, corn cobs, corn stalks and wheat straw. "Alkali lignin" is the only kind of lignin specifically mentioned herein as having been used to form lignin aliphatic acids. Although this "alkali lignin" is frequently termed "lignin" in the specification, it is understood that, in all such instances, "lignin" means "alkali lignin" and that "alkali lignin" refers to the alkali soluble and acid insoluble material mentioned above, whether obtained from wood or other lignocellulosic materials.

The lignin aliphatic acids of the present application are condensation products of alkali lignin and halogen acids. The halogen acids used are chloroacids and bromoacids. It is to be supposed that iodoacids would act like bromo- and chloroacids but, due to the cost, no iodoacids were used in this work. Therefore, in the specification and claims, when "halogen acid" is used it is to be understood that the halogen is chlorine or bromine. The lignin aliphatic acids covered in the claims are condensation products of lignin and alpha halogen acids. It is likely that the lignin aliphatic acids are ethers, formed by the union of phenolic oxygen of alkali lignin with the alkylene group of aliphatic acids. However, due to the uncertainty as to the configuration of lignin, no attempt is made to write detailed structural formulas for the lignin aliphatic acids prepared in the present work, the non-committal formula

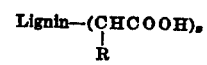

being used, where R is H or an alkyl group, usually $CH_3$, $C_2H_5$ or $C_3H_7$ and where $x$ represents the number of acidic hydrogens in the lignin molecule replaced by the aliphatic acid group.

The main object of this invention is to provide water soluble insecticides, fungicides and wood preservatives, which can be applied in the form of an aqueous solution, which become relatively insoluble on evaporation of the solvent and which, when applied to a plant in the form of a fine spray, adhere tenaciously. Other objects of the invention are to provide a water soluble salt which is readily converted, as desired under field conditions, into the above-mentioned products; to provide a material for sizing paper; and to provide high molecular weight polybasic acids which can be used as intermediates for the preparation of useful industrial products.

The alkali lignin used in this work was variously obtained from the black liquor of the sulfate process, from the black liquor of the soda process, from the lignin sulfonates of the sulfite process, from corn cobs, from corn stalks, from wheat straw, from pine saw dust, from spruce and from bagasse. In all cases the lignin was precipitated from alkaline solution by acidification. For convenience, usually sulfuric acid or hydrochloric acid was used, but other acids, including carbonic, were found to serve for this purpose.

Part of the sulfate process black liquor used as a source of lignin was evaporated to low volume and much of the fatty acids and resin acids was removed as "tall oil soap" before acidification to precipitate the lignin. This black liquor was diluted to give a Beaumé 10° before acidification. The rest of the sulfate black liquor, which was approximately 10° Beaumé as taken from the evaporator, was acidified without dilution and without preliminary removal of any of the fatty acids and resin acids. Lignin from each source was found to be satisfactory for the herein-described study. In each case the alkaline liquid of 10° Beaumé was heated to about 56° C. and acidified by the slow addition of fifty percent sulfuric acid by volume. The mixture was heated again to coagulate the colloids. The precipitated lignin was filtered off, washed with warm water until the wash water gave no test for sulfate and dried in an oven.

The black liquor of the soda process was usually treated substantially in the same manner as the black liquor of the sulfate process, in the isolation of the alkali lignin. In some runs acidification was carried out in the cold, but in such cases filtration of precipitated lignin was much slower than when acid was added to the hot solution.

The lignocellulose materials, such as corn cobs, corn stalks, wheat straw, pine saw dust, spruce saw dust or shavings from bagasse, were heated with three percent sulfuric acid for from three to seven hours and then with dilute sodium hydroxide two or three times for about three hours, each time before most of the alkali soluble lignin was removed. The residue from wood saccharification was not given the preliminary acid treatment, but, after heating several times with dilute alkali, a large amount of residue remained undissolved. The alkali lignin was precipitated from each of the above alkaline solutions by acidification, usually with hydrochloric acid. Alkali lignin was obtained from lignosulfonates of the sulfite process by heating a solution containing approximately fifty percent solids in a sealed tube at 180° for approximately two hours, with half its weight of sodium hydroxide. Upon diluting with about ten volumes of water, filtering, heating the filtrate to boiling and acidifying, the alkali lignin precipitated.

At the outset of this work, lignin from the black liquor of the sulfate process for making paper pulp was used exclusively and a full study was made with lignin thus obtained before alkali lignin from any other source was used extensively. The data for all of the illustrative examples and for Tables I and II were obtained with lignin from this particular source, unless otherwise specified.

After the details of the reaction between alkali lignin and alpha halogen acids had been worked out with lignin from the black liquor of the sulfate process, the reaction was tested with alkali lignin from various other sources. Lignin from each of the sources hereinbefore mentioned reacted in aqueous alkaline solution with alpha halogen acids, as chloroacetic acid, to form salts of lignin aliphatic acids. Thus it is apparent that this reaction, described in detail in the illustrative examples, is one characteristic of alkali lignin, irrespective of the source of the lignin.

In the study of the formation of lignin aliphatic acids from an alkali salt of lignin and alkali salt of certain alpha halogen acids, various solvents were used. It was found that water, methyl alcohol and ethyl alcohol and aqueous solutions of methyl alcohol, ethyl alcohol and isopropyl alcohol are excellent solvents for the reaction. Isopropyl alcohol, alone, was a fair solvent but was not so good as the other solvents just mentioned. Other alcohols and aqueous solutions, particularly alcoholic, may be used, as is shown in Tables I and II, but from the standpoint of yield of lignin aliphatic acid and of cost of solvent, the solvents specifically named above are the most desirable of those tested. From the cost standpoint water is the preferred solvent. However, the ease of recovery of methyl alcohol, ethyl alcohol and isopropyl alcohol makes it possible to use these solvents, either alone or in aqueous solution, at a nominal cost. Also, from the cost standpoint, sodium is the preferred cation in the alkali. However, potassium hydroxide gave excellent results and in some cases may be preferable on account of the greater solubility of potassium hydroxide over sodium hydroxide in alcohols. Because of the cost, chloroacetic acid was used most frequently in the study of the reaction between alkali lignin and a halogen acid, in alkaline solution. However, other alpha halogen acids reacted satisfactorily with alkali lignin, in the presence of alkali, to yield lignin aliphatic acids, as is shown in Tables I and II, below.

The following illustrative examples are given without in any way limiting the invention, to show methods of preparing lignin aliphatic acids:

PREPARATION OF LIGNIN ACETIC ACID

EXAMPLE I

Fifty grams of sodium hydroxide was dissolved in 1 liter of water and 100 grams of alkali lignin was added. The mixture was heated on a boiling water bath and was mechanically stirred to aid in the solution of the lignin. Forty grams of chloracetic acid was added and the mixture was heated on the boiling water bath for two hours under reflux with mechanical stirring. The mixture was cooled, saturated with carbon dioxide and filtered. In this case, no lignin was recovered. The filtrate was acidified with hydrochloric acid, heated and filtered with suction. The precipitate was washed twice with 600 ml. portions of hot water and was filtered with suction each time. After drying in the air, the crude brown colored lignin acetic acid weighed 108 grams. An aliquot portion of the sample dissolved in 5 percent sodium bicarbonate solution to the extent of 93 percent. The yield of sodium bicarbonate soluble product was thus 100 grams, which was the weight of the lignin used initially.

In another similar run, at the end of two hours' heating, the unreacted lignin was converted largely to lignin acetic acid by the addition of 10 grams of sodium hydroxide and 8 grams of chloracetic acid and by heating for 30 minutes more, with stirring. The yield of lignin acetic acid was 91.5 grams.

In another similar run, at the end of two hours heating, the hot solution was treated with 25 ml.

of 12 N hydrochloric acid, added dropwise, with stirring. The stirring and heating were continued for 30 minutes. The solution, containing a small amount of precipitate, was filtered. The precipitate was largely insoluble in sodium bicarbonate solution and was used as part of the 100 grams of lignin in another run. The filtrate was acidified and the precipitate thus formed was filtered, washed and dried. Yield, 92 grams. A small sample of the precipitate, upon being treated with sodium bicarbonate solution, gave an appreciable residue. Another sample of the precipitate was dissolved in sodium hydroxide solution and the solution was acidified. Upon addition of excess sodium bicarbonate solution, practically all of the precipitate dissolved.

On this and various other occasions it was noted that lignin aliphatic acids were less soluble in sodium bicarbonate solution after standing for some time than immediately after being precipitated.

Also, lignin aliphatic acids were obtained by the condensation in aqueous sodium hydroxide solution of lignin with each of the halogen acids: bromoacetic acid, alpha-bromopropionic acid, alpha-bromobutyric acid, alpha-bromovaleric acid and alpha-chloropropionic acid. The first run described above was repeated, without stirring, with the same relative concentrations of chloroacetic acid, sodium hydroxide, water and lignin, the latter from various sources. With alkali lignin from the soda process, from wood saccharification, from bagasse and from wheat straw, the yields of lignin acetic acid were respectively 56 percent, 62 percent, 64 percent and 87 percent of the weight of the lignin used.

EXAMPLE II

To 200 ml. of absolute methyl alcohol 6 grams of sodium was added. To the reaction mixture 20 grams of alkali lignin was added. The mixture was shaken well and 8 grams of chloroacetic acid was added. The mixture was heated under reflux on a boiling water bath for two hours, with occasional shaking. The alcohol was distilled off and the residue was dissolved in 200 ml. of water. Carbon dioxide was passed into the solution to precipitate the lignin. The mixture was filtered and the filtrate was acidified with hydrochloric acid. The precipitate was filtered with suction, washed with water, filtered with suction and air dried. The precipitate weighed 22.2 grams and was soluble in 5 percent sodium bicarbonate solution.

The same general procedure was used with the following solvents: absolute ethyl alcohol, 95 percent ethyl alcohol, n-propyl alcohol, isopropyl alcohol, n-butyl alcohol, isobutyl alcohol, sec-butyl alcohol, tert-butyl alcohol, n-amyl alcohol, sec-amyl alcohol, tert-amyl alcohol and n-hexyl alcohol. Also, a similar procedure was used with potassium ethylate as alkali and with absolute ethyl alcohol as solvent.

When methyl alcohol and ethyl alcohol were used as solvents, the solvent was recovered by distillation from a water bath, as above. With the other alcohols, the solvent was usually recovered by filtration and distillation.

Also, lignin aliphatic acids were prepared, by the above procedure, by the reaction of lignin with bromoacetic acid, alpha-bromopropionic acid, alpha-bromobutyric acid, alpha-bromovaleric acid and alpha-chloropropionic acid, with sodium ethylate in absolute ethyl alcohol as condensing agent. Also, beta-bromopropionic acid reacted with lignin in absolute ethyl alcohol solution, with sodium ethylate as condensing agent, but the yield of lignin propionic acid was much lower than when alpha-bromopropionic acid was used.

Lignin acetic acid was prepared by condensing alkali lignin from wood saccharification with chloroacetic acid, in absolute ethyl alcohol, with sodium ethylate as condensing agent. The yield of lignin acetic acid was 25 percent of the weight of the lignin used. The relative concentrations of solvent, sodium, lignin and chloroacetic acid were the same as in the example immediately above.

EXAMPLE III

To 200 ml. of ethyl alcohol (95 percent) 14.6 grams of potassium hydroxide and 20 grams of alkali lignin were added. After shaking well, 8 grams of chloroacetic acid was added. The mixture was refluxed for 2 hours on a boiling water bath and worked up as in Example II. The lignin acetic acid was soluble in 5 percent sodium bicarbonate solution, but was contaminated with an appreciable amount of inorganic salt. Apparently the gelatinous lignin acetic acid carried down with it considerable inorganic salt, in solution, for, as the precipitate dried, some particles of it were coated with a mold-like growth of water soluble material. In this and similar cases an extra washing was carried out with approximately 200 ml. of water. The yield of dry lignin acetic acid was 21.7 grams. It dissolved completely in 5 percent sodium bicarbonate solution.

Using a somewhat similar procedure, with 10 grams of sodium hydroxide as alkali, the yield of sodium bicarbonate soluble lignin acetic acid was 11.6 grams.

A solution of potassium hydroxide in 95 percent ethyl alcohol served as an effective condensing agent for chloroacetic acid from other sources, the lignin from bagasse yielding 61 percent and from straw 69 percent of its own weight of lignin acetic acid, the ratios of solvent, potassium hydroxide, lignin and chloroacetic acid being the same as in the example above.

EXAMPLE IV

To a solution of 10 grams of sodium hydroxide in 30 ml. of water and 170 ml. of 95 percent ethyl alcohol 20 grams of alkali lignin was added. After shaking well, 8 grams of chloroacetic acid was added and the mixture was heated for 2 hours on a boiling water bath under reflux. The alcohol was distilled off on a water bath and water was added approximately equal in volume to the alcohol distilled off. The product was worked up as in Example II. Twenty-two grams of sodium bicarbonate soluble lignin acetic acid was obtained.

Various quantities of water and alcohol were used as solvents in a series of runs, the amounts of lignin, chloroacetic acid and sodium hydroxide being kept constant. Also, a few runs were made with potassium hydroxide as alkali for the condensation of lignin and chloroacetic acid in varying quantities of water and alcohol as solvents.

An aqueous alcoholic solution of sodium hydroxide proved an effective condensing agent for the reaction of lignin with each of the substances bromoacetic acid, alpha-bromopropionic acid, alpha-bromobutyric acid and alpha-bromovaleric acid.

The run was repeated with alkali lignin from various sources, the same relative concentrations of chloroacetic acid, lignin, sodium hydroxide, water and ethyl alcohol being used as in Example IV. Alkali lignin from the soda process yielded 52 percent; from wood saccharification 65 percent; from bagasse 63 percent; and from wheat straw 66 percent of its own weight of lignin acetic acid.

EXAMPLE V

Ten grams of sodium hydroxide was dissolved in 10 ml. of water. To this solution was added 190 ml. of isopropyl alcohol, 20 grams of alkali lignin and 8 grams of chloroacetic acid. The mixture, which consisted of two layers, with much of the solid undissolved, was heated for 2 hours on a boiling water bath, under reflux. The isopropyl alcohol was recovered by filtration and distillation. Very little of the reaction mixture was left as a residue in the distilling flask. The main residue was dissolved in 200 ml. of water and the lignin acetic acid was isolated as in Example II. The yield of sodium bicarbonate soluble product was 12.7 grams.

A somewhat similar procedure was used with 10 ml. of water and 190 ml. of each of the following solvents: n-butyl alcohol, sec-butyl alcohol, sec-amyl alcohol and dioxane. In each case there were two layers in the reaction mixture.

In addition to the illustrative examples above, a large number of condensations were carried out with alkali lignin and alpha halogen acids, in various solvents and with various alkalies. Tables I and II summarize some of these results. In all of these runs, the temperature was approximately 100° and the time of heating was two hours. (Note: All temperatures given in this specification are centigrade.)

TABLE I
*Preparation of lignin aliphatic acids*

| Halogen acid | Alkali | Solvent | Weights | | | | |
|---|---|---|---|---|---|---|---|
| | | | Lignin | Acid | Alkali | Solvent | Yield [1] |
| ClCH$_2$COOH | Na | C$_2$H$_5$OH | 1.0 | .40 | .30 | 7.9 | .99 |
| Do | do | C$_2$H$_5$OH, 95% | 1.0 | .40 | .30 | 8.2 | .86 |
| Do | do | iso-C$_3$H$_7$OH | 1.0 | .40 | .30 | 7.9 | .20 |
| Do | do | sec-C$_4$H$_9$OH | 1.0 | .40 | .30 | 8.1 | .19 |
| Do | do | tert-C$_4$H$_9$OH | 1.0 | .40 | .30 | 7.9 | .40 |
| Do | do | n-C$_5$H$_{11}$OH | 1.0 | .40 | .30 | 8.2 | .26 |
| Do | do | tert-C$_5$H$_{11}$OH | 1.0 | .40 | .30 | 8.11 | .31 |
| Do | do | n-C$_6$H$_{11}$OH | 1.0 | .40 | .30 | 8.2 | .11 |
| BrCH$_2$COOH | do | CH$_3$OH | 1.0 | .55 | .30 | 7.9 | .57 |
| CH$_3$CHBrCOOH | do | do | 1.0 | .56 | .30 | 7.9 | .23 |
| C$_2$H$_5$CHBrCOOH | do | do | 1.0 | .56 | .30 | 7.9 | .41 |
| C$_3$H$_7$CHBrCOOH | do | C$_2$H$_5$OH, 95% | 1.0 | .56 | .30 | 8.2 | .80 |
| CH$_3$CHBrCOOH | do | C$_2$H$_5$OH | 1.0 | .56 | .30 | 7.9 | 1.01 |
| C$_2$H$_5$CHBrCOOH | do | do | 1.0 | .56 | .30 | 7.9 | .92 |
| C$_3$H$_7$CHBrCOOH | do | do | 1.0 | .56 | .30 | 7.9 | 1.10 |
| ClCH$_2$COOH | KOH | H$_2$O | 1.0 | .40 | .73 | 10.0 | 1.06 |
| BrCH$_2$COOH | NaOH | do | 1.0 | .55 | .50 | 10.0 | .46 |
| CH$_3$CHBrCOOH | do | do | 1.0 | .56 | .50 | 10.0 | .42 |
| C$_3$H$_7$CHBrCOOH | do | do | 1.0 | .56 | .50 | 10.0 | .48 |

TABLE II
*Preparation of lignin aliphatic acids*

| Halogen acid | Alkali | H$_2$O, ml. | Organic solvent, ml. | Weights | | | | |
|---|---|---|---|---|---|---|---|---|
| | | | | Lignin | Acid | Alkali | Solvent | Yield [1] |
| ClCH$_2$COOH | NaOH | 10 | EtOH, 95% 190 | 1.0 | .40 | .50 | 8.3 | .96 |
| Do | do | 30 | EtOH, 95% 170 | 1.0 | .40 | .50 | 8.5 | 1.10 |
| Do | do | 50 | EtOH, 95% 150 | 1.0 | .40 | .50 | 8.7 | .75 |
| Do | do | 100 | EtOH, 95% 100 | 1.0 | .40 | .50 | 9.2 | .98 |
| Do | KOH | 100 | EtOH, 95% 100 | 1.0 | .40 | .73 | 9.2 | 1.06 |
| C$_2$H$_5$CHBrCOOH | NaOH | 100 | 100 | 1.0 | .56 | .50 | 9.2 | .76 |
| Do | do | 10 | n-C$_4$H$_9$OH 190 | 1.0 | .05 | .50 | 8.2 | .31 |
| Do | do | 10 | Sec-C$_4$H$_9$OH 190 | 1.0 | .40 | .50 | 8.2 | .41 |
| Do | do | 10 | sec-C$_5$H$_{11}$OH 190 | 1.0 | .40 | .50 | 8.3 | .25 |
| Do | do | 10 | tert-C$_5$H$_{11}$OH 190 | 1.0 | .40 | .50 | 8.2 | .37 |
| Do | do | 10 | Dioxane 190 | 1.0 | .40 | .50 | 10.3 | .77 |

[1] The yield reported is based on the sodium bicarbonate soluble product. In some of the runs, the procedure for the isolation of the lignin aliphatic acid was as in Example II. In other runs, the reaction mixture was acidified and the precipitate filtered off. The precipitate was extracted with 5 percent sodium bicarbonate solution and filtered. The filtrate was acidified and the precipitate thus formed was filtered off, washed and dried. In other runs in which the procedure in Example II did not yield a product completely soluble in 5 percent sodium bicarbonate solution, an aliquot portion of the precipitate was extracted with sodium bicarbonate and filtered and the residue was dried and weighed. The amount of bicarbonate soluble product in this aliquot portion, multiplied by the proper factor, is the yield reported.

In addition to the solvents listed in the examples and in Tables I and II, a series of less volatile, neutral, water soluble oxygenated solvents were used. Ethylene glycol, diethylene glycol, and glycerol were used, both with sodium hydroxide and with potassium hydroxide as alkali. The alkali was dissolved in a small volume of water and mixed with the high boiling solvent. The mixture was heated to 160° C. to drive off most, or all, of the water and the residual alkaline solution was used as a condensing agent for alkali lignin and chloroacetic acid. After heating two hours on a water bath, the mixture was diluted with about four volumes of water and saturated with carbon dioxide. Very little of the unreacted lignin precipitated, so separation was much less satisfactory than in the illustrative examples and in most of the cases in Tables I and II. Also, recovery of the solvent was more difficult than when the low molecular weight monohydric alcohols were used.

Condensation of alpha halogen acid and alkali lignin was carried out in alkaline solutions containing relatively small amounts of water and various neutral water soluble oxygenated solvents, without the initial heating to a high temperature to drive off the water. Lignin was condensed with alpha-bromopropionic acid and with alpha-bromobutyric acid by means of sodium hydroxide in water and about nineteen times as much of each of the following as of water: glycerol, propylene glycol, ethylene glycol, diethylene glycol, dipropylene glycol, triethylene glycol and carbitol. While the results were fair in a few cases, in most of the runs the yields of lignin aliphatic acids were low. Since these high boiling water soluble oxygenated solvents offer little, if any, advantages and many disadvantages, as compared with water and the cheaper, more volatile organic solvents, such as methyl alcohol, ethyl alcohol and isopropyl alcohol, the study of these high boiling solvents was discontinued.

In this study, for convenience, most of the runs were made at 100°. However, lignin aliphatic acids were formed at room temperature and as high as 250°. Since apparently nothing was gained by use of the higher temperature, no attempt was made to carry out the reaction at temperatures above 250°.

To each of six flasks was added 20 grams of alkali lignin, alkali, 200 ml. of solvent and 8 grams of chloroacetic acid. The flasks and contents were allowed to stand at room temperature for 14 weeks, with four or five shakings in this period. In all cases, except the one in which water alone was used, the solvent was removed by filtration or decantation and replaced by an equal volume of water. Each flask was shaken to bring all solid materials into solution or suspension. The aqueous solution was acidified and the precipitate thus formed was filtered off and dissolved in 5 percent sodium bicarbonate. The bicarbonate solution was filtered and acidified. The resulting precipitate was filtered, washed, dried and weighed. The alkalies, weights of alkalies, solvents used and yields of precipitates are as follows:

| Alkali | Weight, grams | Solvent | Yield, grams |
|---|---|---|---|
| Na | 6 | CH₃OH, absolute | 11.8 |
| Do | 6 | C₂H₅OH, 95 percent | 19.0 |
| KOH | 14.6 | ....do.... | 18.0 |
| NaOH | 10 | H₂O | 13.3 |
| Do | 10 | H₂O, 30 ml., C₂H₅OH, (95%), 170 ml. | 14.0 |
| Do | 10 | H₂O, 10 ml., (CH₃)₂CHOH, 190 ml. | 16.5 |

For the high temperature run, 20 grams of lignin, 10 grams of sodium hydroxide, 200 ml. of water and 8 grams of chloroacetic acid were sealed in a steel tube. The tube was placed in a bomb furnace at 250° for 30 minutes. Upon working up the product by standard procedure, 19.0 grams of lignin acetic acid, soluble in sodium bicarbonate solution was obtained.

While taking data for Tables I and II, the possibility of the reaction between alkali lignin and alpha halogen acids in aqueous solution at room temperature and the fact that alkali lignin slowly becomes soluble if allowed to stand for a prolonged time in a sodium bicarbonate solution, due to the increased alkalinity of the solution, were not recognized. Hence it is possible that the yield of lignin aliphatic acid was increased appreciably, in some cases, during the process of separation from lignin and that some lignin may have been reported as lignin aliphatic acid. The increase in yield of lignin aliphatic acid and the contamination of lignin aliphatic acid would probably be most pronounced in the runs in which the yield of lignin aliphatic acid was lowest, since such runs would have the highest percentages of unreacted lignin and halogen acid.

The lowest yield reported in Tables I and II was with n-hexyl alcohol as solvent. To determine if chloroacetic acid and alkali lignin actually do react, to the extent determined, in n-hexyl alcohol solution, with sodium hexylate as condensing agent, the run was repeated, this time with mechanical stirring. The concentrations of reactants and solvent were the same as in Table I. At the end of the two hours' heating, the reaction mixture was shaken with water and immediately acidified. The aqueous solution, containing the chloroacetic acid, was filtered off and the residue was washed thoroughly before it was treated with sodium bicarbonate solution. The yield of lignin aliphatic acid was 14 percent of the weight of the lignin used, a value greater than was obtained when the mixture was not stirred during the reaction. Thus, if there was a slight error due to failure to recognize the two conditions mentioned above, the increase due to the faulty procedure was less than the actual increase that was obtained by efficient stirring during the reaction.

During one experiment for the separation of lignin acetic acid from unreacted lignin, the tendency of the lignin acetic acid to become insoluble in sodium bicarbonate solution was more evident than usual, so this experiment will be described in some detail.

A sample of lignin acetic acid was stirred with about 25 times its weight of 5 percent sodium bicarbonate solution and the solution was filtered from a slight precipitate. The filtrate was acidified and heated and the precipitate was filtered off with suction and washed with hot water. The precipitate was then stirred with 400 ml. of 5 per cent sodium bicarbonate solution and the solution was filtered. Very little of the precipitate dissolved in the period of several hours in which most of the filtrate ran through the filter paper, since the filtrate, upon acidification, yielded only 1.53 grams of precipitate. However, as the bicarbonate filtrate ran through the paper slowly, sufficient solid came out of solution to clog the funnel. The small amount of liquid remaining in the funnel became more alkaline upon standing and, after five days, was practically completely soluble in 500 ml. of water. The solution, upon acidification, gave a heavy gelatinous precipitate, which was filtered with suction and washed with water. A sample of the gelatinous precipitate was completely soluble in 5 percent sodium bicarbonate solution. The gelatinous precipitate, upon drying, weighed 8.54 grams.

The above experiment was not run on a quantitative basis, as it was started primarily to obtain a sample of lignin acetic acid as free as possible from unreacted lignin. The fact that so much of the precipitated lignin acetic acid became insoluble in dilute sodium bicarbonate solution upon heating suggests that, in other runs, the reported yield of lignin aliphatic acid may have been cut materially by conversion into the less readily soluble form.

Practically all of the runs were made for two hours, to allow ample time for reaction to take place. However, it is likely that, in many cases, the time could be shortened appreciably without much loss in conversion of the lignin to lignin aliphatic acid. For example, in a run at 100°, for one hour, mechanically stirred, with 20 grams of alkali lignin, 10 grams of sodium hydroxide, 200 ml. of water and 8 grams of chloroacetic acid, the yield of lignin acetic acid was 19.5 grams. The product was soluble in sodium bicarbonate solution. In runs made for 30 minutes and for 15 minutes, under similar conditions, much of the product obtained did not dissolve in sodium bicarbonate solution.

In practically all of the runs described above to obtain data 10 ml. of solvent was used for each gram of lignin, in order to obtain complete solution of the lignin, if possible, and to enable the data in various runs to be compared. However, in the runs with organic solvents, with no water present, much of the lignin usually remained undissolved.

The following two runs were made to see whether a large excess of solvent (water, in this case) or a minimum quantity of solvent affects the yield of lignin aliphatic acid appreciably. Ten grams of lignin, 5 grams of sodium hydroxide, 1000 ml. of water and 4 grams of chloroacetic acid, were heated at 100° for 2 hours. The yield of sodium bicarbonate soluble lignin acetic acid was 6.4 grams. In another run, 50 grams of lignin, 25 grams of sodium hydroxide, 150 ml. of water and 20 grams of chloroacetic acid were used and the time of heating was 2 hours. The yield of sodium bicarbonate soluble lignin acetic acid was 51.8 grams.

Also, runs were made with 20 grams of alkali lignin, 200 ml. of water and varying quantities of sodium hydroxide and chloroacetic acid with the following results:

| Sodium Hydroxide, g. | Chloroacetic acid, g. | Yield, g. |
|---|---|---|
| 10 | 2 | 1.2 |
| 10 | 4 | 10.2 |
| 10 | 6 | 11.4 |
| 15 | 12 | 17.5 |
| 20 | 16 | 12.9 |
| 40 | 8 | 1.5 |

For the commercial preparation of lignin aliphatic acids it will probably be convenient to use a lower ratio of solvent to lignin than was used in most of the work described in this application; to replace the water evaporated instead of using a reflux apparatus, when water is used as a solvent; and to change most of the unreacted lignin to lignin aliphatic acid, instead of separating the products at the end of the regular run. The following experiments were carried out to check on these proposed modifications of the procedures generally used in this work and to prepare lignin aliphatic acids for study.

Alkali lignin was dissolved in aqueous alkali and alpha halogen acid was added. The solution was heated on a hot plate, the water lost by evaporation being replaced from time to time with hot water. At the end of 1.5 hours heating, 20 percent of the alkali and 20 percent of the halogen acid used initially were added and the heating was continued for 30 minutes more. The hot alkaline solution was acidified with hydrochloric acid and the precipitated lignin aliphatic acid was filtered off with suction and washed with hot water. The reactants and results are summarized as follows:

| Lignin, grams | 200 | 200 | 100 | 100 |
|---|---|---|---|---|
| Sodium hydroxide, (total), grams | 120 | 120 | 70 | 70 |
| Water, ml | 1000 | 1000 | 500 | 500 |
| Halogen acid | $ClCH_2COOH$ | $CH_3CHClCOOH$ | $CH_3CH_2CHBrCOOH$ | $C_3H_7CHBrCOOH$ |
| Halogen acid, (total), grams | 96 | 102 | 72 | 72 |
| Yield, lignin aliphatic acid, g | 208 | 181 | 99 | 112 |

Twenty-five gram samples of each of the above lignin aliphatic acids were dissolved in aqueous solutions, each containing 10 grams of sodium hydroxide. The solutions were acidified with hydrochloric acid to precipitate the lignin aliphatic acid (and unchanged lignin, if any). To each of the aqueous suspensions 400 ml. of five percent sodium bicarbonate solution was added; after standing for 30 minutes the solutions were filtered into hydrochloric acid solution. The bicarbonate solutions dissolved practically all of the product in each case. The precipitates formed in the hydrochloric acid solution were filtered off with suction, washed with hot water and air dried. The lignin aliphatic acids thus obtained were used to determine neutral equivalents and melting points. The results obtained were as follows:

|  | Neutral Equivalent | M. P. |
|---|---|---|
|  |  | Degrees |
| Lignin acetic acid | 348, 350, 352 | (1) |
| Lignin propionic acid | 395, 398, 385 | 190–210 |
| Lignin butyric acid | 420, 427, 422 | 180–206 |
| Lignin valeric acid | 430, 427 | 187–205 |

1 With this particular sample of lignin acetic acid, at 285°, only about 25 percent was liquid. The sample did not melt completely. At 310° there was a carbonaceous residue. Another sample of lignin acetic acid turned black at 208° and softened at 230°, but did not melt entirely, even though heated to 310°, at which point it was a carbonaceous residue.

As is evident from the melting points given above, the products listed as lignin aliphatic acids probably were not pure compounds. This is to be expected, since alkali lignin, the initial material used in this work, probably is, as A. Bailey (see Technical Association Papers, Series XXIV, No. 1, page 621 (1941), published by Technical Association of the Pulp and Paper Industry, New York, N. Y.) characterizes the lignin in wood, "a mixture of isomers and homologues so nearly identical as to preclude separation."

The neutral equivalents given above, and others determined in this work, were made by dissolving the samples in excess standard alkali and by titration of excess alkali with standard hydrochloric acid, with phenolphthalein paper as outside indicator. In the determination of the values given above, samples of 3.000 grams were used and the alkali was approximately 1 N. The titrations were carried out in small volume, viz., about 50 ml. Each solution was filtered to see if all of the product dissolved. In none of the above cases was there an appreciable residue, but in some other titrations the residues were appreciable, so in such cases the weight of the residue was deducted from the total weight of the sample to get the amount which reacted with the standard alkali.

In the study of lignin acetic acid, neutral equivalents were obtained, in some cases lower than 300 and in others, over 400. Since from the same batch of alkali lignin, lignin acetic acid was at times obtained with considerable difference in neutral equivalents, the conclusion was reached that apparently the number of

groups combining with a molecule of lignin was not always the same. Whatever the cause for the variation in neutral equivalent, lignin acetic acid with a very low neutral equivalent and lignin acetic acid with a very high neutral equivalent resembled each other and lignin acetic acid with an intermediate neutral equivalent in forming insoluble copper and zinc salts, which salts dissolved in excess ammonium hydroxide. This property is the basis for some of the most important uses found to date for the lignin aliphatic acids. Although the copper salts and zinc salts of lignin acetic acid with varying neutral equivalents dissolved in ammonium hydroxide, appreciably more ammonium hydroxide was needed for a sample with a high neutral equivalent.

As stated above, alkali lignin from the black liquor of the sulfate process was studied fully before alkali lignin from any other source was used extensively for the synthesis of lignin aliphatic acids. Thus, the data given above were obtained with lignin from the black liquor of the sulfate process, unless otherwise stated. In the study of alkali lignin from this source, it was found that sodium (dissolved in an alcohol), sodium hydroxide or potassium hydroxide could be used satisfactorily as a source of alkali and that water, methyl alcohol, ethyl alcohol or aqueous solutions of methyl alcohol, ethyl alcohol or isopropyl alcohol served satisfactorily as solvents. Other solvents were found to serve fairly well in some cases but, for the reasons mentioned above, the solvents listed immediately above were most suitable. It was found possible to vary experimental conditions, such as temperature, time, relative concentrations of reactants, etc., and still obtain fair yields of lignin aliphatic acids. However, if sufficient chloroacetic acid was not present to react with most of the lignin, separation of the unreacted lignin from the lignin acetic acid proved difficult.

With alkali lignin from other sources (from wood saccharification, from the soda process, from the sulfite process, from corn cobs, from corn stalks, from wheat straw, from pine saw dust, from spruce and from bagasse), the solvents used with lignin from the black liquor of the sulfate process were found to be satisfactory. Also, sodium (dissolved in an alcohol), sodium hydroxide and potassium hydroxide were found to be satisfactory as alkalies for the condensation of alkali lignin from such other sources with alpha halogen acids. Alkali lignin from each of the sources mentioned was condensed, in aqueous sodium hydroxide solution, with each of the halogen acids, chloroacetic, bromoacetic, alpha-chloropropionic, alpha-bromobutyric and alpha-bromovaleric. In each case the reagents usually were approximately in the same concentrations as in the corresponding experiment with lignin from the sulfate process. As in most of the runs with sulfate process lignin, the time of heating was two hours and the temperature was approximately 100°. The reaction products of alkali lignin and the halogen acids from acetic to valeric were isolated by standard procedure, as follows: The reaction mixture was acidified, usually with appreciable dilution. The precipitate thus formed was filtered and washed. The residue on the filter paper was treated with five percent sodium bicarbonate solution and filtered. The filtrate was acidified with hydrochloric acid and the precipitate thus formed was filtered, washed and dried. In each case an appreciable yield of lignin aliphatic acid was obtained.

Alkali lignin from each of the sources mentioned in the preceding paragraph was also caused to react with chloroacetic acid in methyl alcohol (with sodium methylate as condensing agent); in ethyl alcohol (with sodium ethylate as condensing agent); in isopropyl alcohol (with sodium isopropylate as condensing agent); in aqueous methyl alcohol solution; in aqueous ethyl alcohol solution; and in aqueous isopropyl alcohol solution (with sodium hydroxide or potassium hydroxide, usually the former, as condensing agent). In each case the ratio of water to alcohol was approximately 1:3 by volume; the reaction mixture was diluted with water and acidified with hydrochloric acid; the precipitate thus formed was filtered; and lignin aliphatic acid was isolated by standard procedure, as above. In each case some bicarbonate soluble lignin acetic acid was formed.

Each of the experiments just described was repeated with some alpha halogen acid other than chloroacetic acid. In each case a lignin aliphatic acid, soluble in sodium bicarbonate solution, was obtained.

Since alkali lignin from each of the sources tested reacted so readily with each of the lower halogen acids used, the work is being extended to include higher alpha halogen acids and other halogen acids. Preliminary work indicates that alpha-chlorolauric acid, alpha-chlorostearic acid, alpha-bromoisocaproic acid, alpha-bromolauric acid, alpha-bromopalmitic acid and alpha-bromostearic acid react with alkali lignin in aqueous alkaline solution to yield derivatives comparable to the lignin aliphatic acids described above. Judging by the work done to date, the yields are much lower and the isolation of the reaction product is much more difficult than when lignin acetic acid, lignin propionic acid, lignin butyric acid and lignin valeric acid are formed. The work is being continued in an attempt to improve the yields and to find uses for the lignin derivatives of the higher fatty acids in which these products will prove more serviceable than the corresponding derivatives of the lower fatty acids. Preliminary work indicates that each of these lignin derivatives of the higher acids, in ammonium hydroxide solution, forms a good sizing agent for paper.

It has been found that alkali lignin reacts with beta-bromopropionic acid in alkaline solution, but the yield is much lower than when alpha-bromopropionic acid is used. Also, alkali lignin reacts to some extent in alkaline solution with dichloroacetic acid and trichloroacetic acid. In view of the cost of the polyhalogen acids, the work with them is not being continued.

The combination of properties possessed by lignin acetic acid, lignin propionic acid, lignin butyric acid and lignin valeric acid makes these substances of great value for the formation of industrial products, as explained elsewhere in the specification. This combination of properties is not held exclusively by a particular substance with a definite melting point and a definite neutral equivalent, but by the class of substances designated in this specification as lignin aliphatic acids, each of which is formed by the action of alkali lignin, in alkaline solution, with an alpha halogen acid of from two to five carbons. It is accordingly to be understood that these lignin aliphatic acids and the process of making them, as described in the specification and defined in the claims, constitute the invention, which is in no way dependent upon or limited by the analytical data and melting points given hereinbefore.

Since the lignin aliphatic acids are new products, their fields of usefulness must be determined by experimentation. A study of their properties has been made to find uses and limitations on apparent uses.

Lignin acetic acid is the cheapest of the lignin aliphatic acids, so it is being studied most fully. The properties discovered for lignin acetic acid are usually found to be held, to a great extent, by the other lignin aliphatic acids through lignin valeric acid.

Lignin acetic acid and practically all of its salts are relatively insoluble in water. The sodium, potassium and ammonium salts are exceptions, being quite soluble in water. In salts of lignin acetic acid and salts of lignin propionic acid, lignin butyric acid and lignin valeric acid, potassium is substantially the equivalent of sodium and zinc is substantially the equivalent of copper.

An ammoniacal solution of lignin acetic acid, applied to porous materials, such as unsized paper, cloth and wood, upon evaporation leaves in the porous material a relatively insoluble product which retards water penetration. This property is also observed and in some cases accentuated, when certain cations are present in the ammoniacal solution of lignin acetic acid. When this solution is applied in a very thin layer, as in the form of a spray, to a surface such as that of a plant leaf, a tenacious layer is left adhering to the surface upon evaporation of the liquid.

Various substances can be dissolved in or intimately mixed with the ammoniacal solution of lignin acetic acid and the cations. The relatively insoluble residue left upon evaporation of the ammoniacal solution tends to hold with it other substances present in the solution.

These properties of lignin acetic acid and its salts make it extremely useful in impregnating paper, cloth, wood and other porous materials, in the formation of insecticides, fungicides and wood preservatives. Various other uses, predicated upon the properties of the lignin aliphatic acids described herein, will occur to persons skilled in the various arts. Tests carried out with lignin propionic acid, lignin butyric acid and lignin valeric acid indicate that these products can be used for the same purposes as lignin acetic acid.

Some of the tests made in the determination of the above-mentioned properties and certain of the uses due to these properties will now be described.

A sample of lignin acetic acid was converted to the soluble sodium salt by the addition of the acid to a hot sodium hydroxide solution until the solution was no longer basic or was barely basic to phenolphthalein paper. The hot solution, filtered from a slight residue, was evaporated on a hot plate, with frequent stirring, until a thick paste was formed. The sticky paste was spread on the sides of the container and allowed to stand exposed to the air. Within a few days the sticky paste changed to a black solid. Another sample of the sodium salt was formed by adding sodium hydroxide solution to a suspension of the solid in water until the solution was barely basic to phenolphthalein paper. The solution, filtered from a slight residue, was evaporated to low volume on a hot plate and to dryness in the oven.

The black solid, sodium lignin acetate, is quite soluble in water, but is not hygroscopic. With slight warming it dissolves readily in twice its weight of water and, upon evaporation of the solution, becomes very concentrated before any solid settles out. No precipitate came out of a solution containing 33 percent by weight of sodium lignin acetate while it was stoppered tightly in a flask, but upon exposure of a sample in a beaker for a few days, it changed successively to a pitch, a sticky solid and a dry solid.

For most of the qualitative tests with sodium lignin acetate, it was used in one percent aqueous solution. Heavy precipitates were formed by the addition of the following volumes of 0.1 molar solution of each of the following cations to 5 ml. of one percent solution of sodium lignin acetate.

| Cation | Volume, ml. |
|---|---|
| $Cu^{++}$ | 0.4 |
| $Zn^{++}$ | 0.8 |
| $Cd^{++}$ | 0.5 |
| $Co^{++}$ | 0.6 |
| $Ni^{++}$ | 0.6 |
| $Ag^{+}$ | 1.2 |
| $Pb^{++}$ | 0.4 |
| $Hg^{++}$ | 0.6 |
| $Mn^{++}$ | 0.5 |
| $Al^{+++}$ | 0.3 |
| $Fe^{++}$ | 2.5 |
| $Fe^{+++}$ | 0.3 |
| $Ba^{++}$ | 1.5 |
| $Sr^{++}$ | 0.6 |
| $Ca^{++}$ | 0.6 |
| $Mg^{++}$ | 1.4 |

The mercurous and bismuth salts also readily gave precipitates with sodium lignin acetate, but, since the acid used to hold the cations in solution may have been a contributing factor in the formation of the precipitate, the values are not given.

The precipitates with $Cu^{++}$, $Zn^{++}$, $Cd^{++}$, $Co^{++}$, $Ni^{++}$ and $Ag^{+}$ dissolved readily when treated with excess ammonium hydroxide. The $Al^{+++}$, $Hg^{++}$, $Pb^{++}$, $Fe^{+++}$ and $Cr^{+++}$ lignin acetates showed a definite increase in solubility when treated with excess ammonium hydroxide and ammonium lignin acetate. Ammoniacal solutions of each of the above cations and lignin acetic acid, upon absorption in a porous material and evaporation of the solution, left the cation and lignin acetic acid, probably in the form of a salt of the cation and lignin acetic acid, dispersed throughout the porous material. In each case the product showed a distinct water-repelling power. These ammoniacal solutions of the various cations and lignin acetic acid are being studied further with the view to their commercial applications.

To date, the aluminum, copper and zinc salts of lignin acetic acid have been studied most fully. An ammoniacal solution of each of these salts forms an excellent sizing agent for paper. The following example is given to illustrate this important use of lignin acetic acid:

EXAMPLE VI

*Paper sizing with aluminum lignin acetate in ammoniacal solution*

One volume of 10 percent $Al_2(SO_4)_3 \cdot 18H_2O$ and 4 volumes of 10 percent sodium lignin acetate in 2.4 N ammonium hydroxide were diluted with 75 volumes of water. A sheet of 50 lb. unsized kraft paper was dipped in this solution and air dried (sheet A). Another sheet (B) of 50 lb. unsized kraft paper was dipped in a water bath, held by a corner for 30 seconds to drain off excess water, dipped into the ammoniacal solution and air dried. A third sheet (C) of the same paper was dipped into water and allowed to dry. The following tests were obtained:

|  | Size (dry indicator method) | Mullen (lbs./sq. in.) | Tear (Elmendorf method) | |
| --- | --- | --- | --- | --- |
|  |  |  | M. D. | C. D. |
| Sheet A | 55 | 52.8 | 130 | 166 |
| Sheet B | 41 | 54.6 | 136 | 172 |
| Sheet C | 0 | 55.1 | 116 | 176 |

Thus, it is seen that either a dry or a wet sheet, on being dipped into this ammoniacal solution, acquires an excellent size and is not materially affected as regards the Mullen or tear test.

Paper sized with an ammoniacal solution of either copper lignin acetate or zinc lignin acetate also gave good size, Mullen and tear tests.

For most purposes, it is preferable to use aluminum salts rather than copper or zinc salts, in the sizing of paper. However, for special purposes, particularly when it is necessary to protect the paper against the ravages of certain insects or fungi, the presence of small amounts of certain copper or zinc salts in the paper is desirable. Tests carried out in this study indicate that neither copper lignin acetate nor zinc lignin acetate had any appreciable activity against the common mildew fungi, possibly due to the very low solubility of these salts. However, both of these salts do promote to a great degree the water repelling power of paper and other porous materials which they permeate and, for this reason, either the copper or zinc salt of lignin acetic acid can be used advantageously with various fungicidal and insecticidal substances and wood perservatives.

Copper lignin acetate and zinc lignin acetate are quite soluble in ammonium hydroxide. In solution in this solvent they can be used to permeate porous materials or they can be applied to a surface, such as a plant leaf, in a thin layer, as in a spray. Along with the copper lignin acetate or zinc lignin acetate, various other substances can be used in the ammoniacal solution to give it particular properties. Upon evaporation of the ammonium hydroxide the copper lignin acetate or zinc lignin acetate is left as a relatively insoluble product, permeating the porous material or coating the surface to which it was applied. The water repelling power of the copper lignin acetate and zinc lignin acetate and the tenacity with which each holds to the substance to which it is applied tend to prevent the washing away of the materials mixed with it. Examples of the use of copper lignin acetate in an insecticide, in a fungicide and in a wood preservative (copper being replaceable by zinc in each instance) are given below:

EXAMPLE VII

Copper lignin acetate in an insecticide

An excellent insecticide is made by the following procedure (all parts by weight):

Dissolve one part of $Na_2HAsO_4.12H_2O$ in 9 parts of water. Dissolve 1.5 parts of sodium lignin acetate in 9 parts of hot water (or use a solution previously prepared). Mix the two solutions. To this mixture add, with stirring, 1.25 parts of blue vitriol dissolved in 6 parts of 6 N ammonium hydroxide. Store in a tight container. Before using, mix one volume of the concentrated solution with 9 volumes of water.

The above insecticide (A) was found to have very little, if any, "burning" effect upon bean seedlings, when applied under the conditions existing in a greenhouse. However, insecticide A did prove to be somewhat toxic to snap beans and lima beans under field conditions. Insecticides A showed no signs of being toxic to Irish potatoes and one application affected excellent control of the Colorado potato beetle in a field heavily infested with the insect. Although the toxicity of insecticide A limits its usefulness upon beans, it proved effective against the Mexican bean beetle. In view of its high effectiveness and tenacity, a further study of this insecticide is being made, with the object of lowering its toxicity to tender plants while maintaining its adherence to plants and its high effectiveness against chewing insects.

In the tests with insecticide A it was found to form a solution, not a suspension, as is characteristic of Paris green, lead arsenate, calcium arsenate and magnesium arsenate, the arsenical insecticides most commonly recommended. Since there was no suspension there was no settling out of any substance. The insecticide remained uniformly distributed throughout the solution, even though kept for several weeks after dilution before being applied to the plants. (Note: The diluted solution, like the concentrated solution, must be kept tightly enclosed or the ammonia will evaporate and allow the copper lignin acetate and copper arsenate to precipitate. Should ammonia escape, allowing some precipitate to form, the precipitate can be redissolved by the addition of more ammonium hydroxide.) The insecticide A was applied in the form of a fine spray, much finer than would have been possible with a nozzle large enough to allow solid particles of appreciable size to pass through it. Consequently, the spray was brought into contact with the entire surface of the leaves of the plant to which it was applied and spread well over the leaves because of the wetting power of the solution. Upon evaporation of the ammoniacal solution the copper lignin acetate and copper arsenate adhered firmly to the leaves of the plant. On some test leaves, a spray equivalent to about 1.5 inches of rainfall, while it removed some of the insecticide left sufficient to kill Japanese beetles which were allowed to feed on the leaves.

The insecticidal solution A also afforded excellent protection for wood against the destruction of termites. Pieces of pine laths were heated in a sealed tube with solution A for three hours at 100°. The treated wood was brought into contact with large active colonies of termites under both field and laboratory conditions. Untreated pieces of wood were used as controls and placed side by side with the treated pieces. Termites were found crawling over and under the treated pieces but in no instance had they eaten into the treated wood, although they were kept in contact with it for three weeks and longer. The untreated pieces used as controls were well eaten by the insects.

An effective insecticide against aphids was formed by mixing 1 part of nicotine with 2 parts of lignin acetic acid and 17 parts of water (all parts by weight) and by filtering from a slight residue. Before using, the above solution was diluted with 19 parts of water to form insecticide B. An excellent insecticide, effective against both aphids and chewing insects, was formed by mixing equal volumes of undiluted insecticides A and B and by diluting with 19 volumes of water.

Combinations of insecticide A and other insecticides are being tested. One of these which seems most worthy of study is an emulsion of DDT (dichlorodiphenyltrichloro ethane) in Varsol and insecticide A, the emulsion being stabilized by about 1.25 percent of Emulphor A. G. Oil Soluble, a product of General Dyestuffs Corporation. DDT is said to be relatively ineffective against the Mexican bean beetle (see Journal of Chemical Education, 22, 282 (1945)). Since insecticide A was found to kill the Mexican bean beetle, it is thought that perhaps the toxicity of copper arsenate to chewing insects and the tenacity with which insecticide A is held to plant leaves may cause the combination insecticide to be more universal in action than is either DDT or insecticide A alone.

Insecticide A was found to inhibit, although it did not completely prevent, the growth of the common mildew fungi.

An effective insecticide C was formed by substituting an equimolar quantity of zinc sulfate for the copper sulfate in insecticide A. In such salts, zinc is substantially the equivalent of copper, as hereinbefore stated.

Insecticide C was found to be comparable to insecticide A in the control of Colorado potato beetle but more toxic than A under field conditions. Also, insecticide C was found to protect wood from termites; they did not eat the wood which had been impregnated with insecticide C, although they crawled all over it.

For the terminte proofing of wood, an ammoniacal solution of copper lignin acetate was found to be quite effective. Wood was impregnated with a solution which was 0.15 normal in ammonium hydroxide and which contained 0.5 percent of blue vitriol and 1.2 percent of sodium lignin acetate. This wood, along with that impregnated with insecticide A and insecticide C, was placed in a runway under a log swarming with termites. The termites crawled all over the wood, but, as with other treated samples, did not eat it. The apparent aversion of the termites to eating this wood leads one to question whether it is necessary to have the highly toxic cupric arsenate in the wood, as in insecticide A, to render it termite proof.

EXAMPLE VIII

*Copper lignin acetate in a fungicidal water repelling agent*

A stock solution was made containing 10 parts by weight of lignin acetic acid and 98 parts of 2.4 normal ammonium hydroxide. Two volumes of this solution were mixed with one volume of 10 percent $CuSO_4.5H_2O$ and 17 volumes of water. This solution, A, when used to impregnate paper and pasteboard, was found to give pronounced water repellence. The above solution, when diluted with three volumes of water, yielding a concentration of copper sulfate and lignin acetic acid of 0.125 and 0.25 percent respectively, was found to be a good sizing agent. Fifty pound kraft paper, on being immersed in it and dried, had a size test (dry indicator method) of 40 seconds, a Mullen test of 54.7 lbs./sq. in. and tear tests of 140 (M. D.) and 164 (C. D.). (Elmendorf method).

A solution of one percent ortho-phenylphenol was made in 0.12 normal sodium hydroxide. One volume of this solution was added to 19 volumes of solution A, above, and 0.05 volume of 5 normal ammonium chloride was added. Pasteboard, impregnated with this solution, dried and rinsed with water to remove soluble ammonium salts, had a pronounced fungicidal activity toward the common mildew fungi. Paper, treated similarly, had a distinct fungicidal activity toward the same fungi but the effect was not so pronounced as with the pasteboard, likely due to the smaller amount of solution absorbed by the paper. The following data were obtained with a sheet of kraft paper, after being immersed in the solution and air dried:

Basic weight _____ 57.5
Size test (dry indicator method) _____ 64
Mullen (lbs./sq. in.) _____ 58.4
Tear (Elmendorf method _____ 156 (M. D.), 176 (C. D.)

Many uses for such paper will occur to those persons skilled in the various arts.

Wood, impregnated with the above solution, was found to be repellent to termites.

The study is being continued, with varying concentrations of soluble copper salts, lignin acetic acid, ammonium hydroxide, ortho-phenylphenol, sodium hydroxide and ammonium chloride. Also, tests are being carried out with other fungicidal agents instead of ortho-phenylphenol and with zinc salts instead of copper salts.

In one solution, an equal weight of pentachlorophenol was substituted for ortho-phenylphenol in the ammoniacal solution of copper sulfate and lignin acetic acid described above. Pasteboard, impregnated with this solution, dried and rinsed to remove soluble ammonium salts, had a distinct fungicidal activity toward the common mildew fungi. Paper and pasteboard, impregnated with this solution and dried, had a pronounced water repellence. Wood, impregnated with this solution, had repellent action toward termites. Wood, impregnated with a similar solution but with zinc sulfate instead of copper sulfate, had repellent action toward termites.

Ammoniacal solutions of copper sulfate, lignin acetic acid and other polyhalogenated phenols were found to impart water repellence to paper and pasteboard impregnated with them. Also, water repellence was noted in paper and pasteboard impregnated with ammoniacal solutions of zinc sulfate, lignin acetic acid and the same polyhalogenated phenols. Preliminary tests with an ammoniacal solution of copper sulfate, lignin acetic acid and naphthenic acid indicate high water repellence for paper and cloth impregnated with it. Since copper naphthenate has been found to be so valuable for rot-proofing canvas, a study is being made of the fungicidal activity of canvas impregnated with the solution just described.

Lignin propionic acid, lignin butyric acid and lignin valeric acid resemble lignin acetic acid in that all form soluble sodium salts and that the sodium salts of each of the above lignin aliphatic acids form precipitates readily with each of the cations $Cu^{++}$, $Zn^{++}$, $Al^{++}$, $Cd^{++}$, $Co^{++}$, $Ni^{++}$, $Ag^+$, $Hg^+$, $Hg^{++}$, $Pb^{++}$, $Mn^{++}$, $Fe^{++}$, $Fe^{+++}$, $Ba^{++}$, $Cr^{+++}$, $Ca^{++}$ and $Mg^{++}$. Ammonium hydroxide dissolves readily the $Cu^{++}$, $Zn^{++}$, $Cd^{++}$, $Co^{++}$, $Ni^{++}$ and $Ag^+$ salts of each of the lignin aliphatic acids listed above. Also, ammonium hydroxide and the ammonium salt of each of the above lignin aliphatic acids increase the solubility of the salts of $Al^{+++}$, $Pb^{++}$, $Hg^{++}$, $Fe^{+++}$ and $Cr^{+++}$ with the same lignin aliphatic acid. Effective insecticides and wood preservatives were formed by substituting in insecticide A sodium lignin propionate, sodium lignin butyrate or sodium lignin valerate for the sodium lignin acetate. Also, effective insecticides and wood preservatives were made by substituting sodium lignin propionate, sodium lignin butyrate and sodium lignin valerate for sodium lignin acetate in insecticide C. These latter products showed a greater tendency to precipitate slightly than did the other solutions mentioned above, so, for these solutions containing zinc and the lignin aliphatic acids above acetic acid, the concentration of ammonium hydroxide was made approximately double that in insecticides A and C.

No data were taken for the solubility of the various copper lignin aliphatic acid salts, but casual observation in a very rainy season seemed to indicate that copper lignin propionate, copper lignin butyrate and copper lignin valerate adhere even more tenaciously to plant leaves than does copper lignin acetate.

Excellent sizing agents for paper were prepared by forming ammoniacal solutions of each of the cations $Al^{+++}$, $Cu^{++}$ and $Zn^{++}$ with each of the substances lignin propionic acid, lignin butyric acid and lignin valeric acid. Also, each of the above lignin aliphatic acids had a definite sizing action when ammoniacal solutions of the acids were used to impregnate unsized kraft paper.

Lignin acetic acid was heated with various glycols, amino alcohols and ether alcohols at 190° for 14 hours and at 210° for 16 hours. Also, it was heated with glycerol at 205° for 14 hours. In most cases dark resinous masses were formed. Even though no pressure was used in these preliminary experiments, some of the products formed had properties which indicate their utility as plastics. The condensation products of lignin acetic acid with each of the compounds listed below appear particularly worthy of study as plastics:

| Compound | Approximate per cent of weight of lignin acetic acid | Temperature, °C. | Time, hours |
|---|---|---|---|
| Ethylene glycol | 50 | 210 | 16 |
| Diethylene glycol | 50 | 210 | 16 |
| Triethylene glycol | 50 | 210 | 16 |
| Diethanolamine | 50 | 210 | 16 |
| Carbitol | 100 | 210 | 16 |
| Dipropylene glycol | 13 | 190 | 14 |
| Dipropylene glycol | 50 | 190 | 14 |
| Ethylene glycol | 13 | 190 | 14 |
| Butylethanolamine | 13 | 190 | 14 |
| Butylethanolamine | 50 | 190 | 14 |
| Carbitol | 13 | 190 | 14 |
| Carbitol | 50 | 190 | 14 |
| Phenyl Cellosolve | 13 | 190 | 14 |
| Ethanolamine | 13 | 190 | 14 |

The study of lignin acetic acid and other lignin aliphatic acids as plastic intermediates is being continued.

I claim:

1. As new products, derivatives of alkali lignin of the structure

Lignin—$(CHCOOH)_x$
　　　　　　|
　　　　　　R where $x$ represents the number of acidic hydrogens of the alkali lignin replaced by the group

—CHCOOH
　|
　R and R is a member of the group consisting of hydrogen and methyl, ethyl and propyl radicals.

2. As a new product, a derivative of alkali lignin of the structure

Lignin—$(CH_2COOH)_x$ where $x$ represents the number of acidic hydrogens of the alkali lignin replaced by the group —$CH_2COOH$.

3. As new products, water soluble salts of the compounds of claim 1 in which hydrogens of the carboxyl groups are replaced by a member of the group consisting of $NH_4+$, $Na+$ and $K+$.

4. As new products, water soluble salts of the compounds of claim 2 in which hydrogens of the carboxyl groups are replaced by a member of the group consisting of $NH_4+$, $Na+$ and $K+$.

5. A process for converting alkali lignin into a lignin aliphatic acid which includes the step of reacting alkali lignin in aqueous alkaline solution with an alpha halogen acid, the acid being a member of the group consisting of acetic, propionic, butyric and valeric, said halogen being selected from the group consisting of chlorine and bromine.

6. A process for converting alkali lignin into a lignin aliphatic acid which includes the step of reacting alkali lignin with a lower alpha halogen acid and alkali in a highly polar solvent taken from the group water, methyl alcohol, ethyl alcohol and aqueous solutions of methyl alcohol, ethyl alcohol and isopropyl alcohol, the acid being a member of the group consisting of acetic, propionic, butyric and valeric, said halogen being selected from the group consisting of chlorine and bromine.

7. A process for converting alkali lignin into lignin acetic acid which includes the step of reacting alkali lignin with chloroacetic acid and alkali in a highly polar solvent which is a member of the group consisting of water, methyl alcohol, ethyl alcohol and aqueous solutions of methyl alcohol, ethyl alcohol and isopropyl alcohol.

8. As new products, water insoluble salts of the compounds of claim 1, in which hydrogens of the carboxyl group are replaced by a member of the group consisting of $Cu^{++}$, $Zn^{++}$ and $Al^{+++}$.

9. As new products, water insoluble salts of the compound of claim 2, in which hydrogens of the carboxyl groups are replaced by a member of the group consisting of $Cu^{++}$, $Zn^{++}$ and $Al^{+++}$.

JOHN S. PIERCE.

REFERENCES CITED

The following references are of record in the file of this patent:

UNITED STATES PATENTS

| Number | Name | Date |
|---|---|---|
| 2,156,160 | Olson | Apr. 25, 1939 |
| 2,379,889 | Dorland et al. | July 10, 1945 |

OTHER REFERENCES

Nikitin et al., J. Applied Chem. (U. S. S. R.), 10, 1915–20; cited 32 CA 1929 (1938).

Schutz, Cellulosechem. 18, 76–83 (1940); cited 35 CA 6448 (1941).

Schutz, Cellulosechem. 19, 87 (1941); Svensk Papperstidn. 44, 440 (1941); cited 36 CA 6795 (1942).